Sept. 3, 1946.  W. G. PALMER  2,406,898
CAP LINING MATERIAL AND METHOD OF PRODUCING THE SAME
Filed Aug. 18, 1943
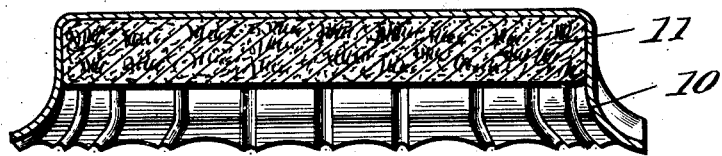
Inventor
Wilson G. Palmer
By Mason, Porter & Diller,
Attorneys Patented Sept. 3, 1946

2,406,898

UNITED STATES PATENT OFFICE 2,406,898

CAP LINING MATERIAL AND METHOD OF PRODUCING THE SAME

Wilson G. Palmer, Chicago, Ill., assignor to Continental Can Company, Inc., New York, N. Y., a corporation of New York Application August 18, 1943, Serial No. 499,123

6 Claims. (Cl. 288—34)

It is common to employ caps for closing containers, and to utilize a resilient lining material between the cap and the lip of the container. For example, bottles and metal containers are sealed by crown caps with the employment of a cork disc within the cap. When the material of the cap lining contains tannins and like substances, a reaction occurs between such a substance and the metal of the cap, whereby a colored iron salt is produced. This discoloration finds its way through the disc and appears at the exposed face. This action is facilitated particularly when the cap is made of black iron rather than of tinplate, and is accelerated by penetration of the contents of the container through the lining material, particularly when a spot is not employed.

It has been found that this discoloration in the presence of a ferrous cap can be avoided by a preliminary treatment of the lining material. For example, a cork disc is immersed in a 10% to 25% solution of a material which forms a practically insoluble ferric salt, the degree of ionization of which is less than that of the iron-tannin complex, with the solution heated just to the boiling point. The disc is removed and allowed to cool, or may be permitted to soak in the solution while cooling for a time of some hours. The disc is then washed with tap water and dried at 98° F.

The impregnated disc is then employed in forming a cap.

In the accompanying drawing, the employment of such a disc with a crown cap is illustrated. The ferrous metal body 10 is formed with the usual edge crimps, and receives the impregnated disc 11, which may be seated in place by use of gutta percha or other suitable material.

Among the substances which have been found effective are the following:

(1) A 25% solution of sodium hexametaphosphate (the commercial product known as Calgon has been found practical).

(2) A 15% solution of sodium pyrophosphate containing 2% of citric acid.

(3) A 15% solution of sodium pyrophosphate containing 5% of citric acid.

(4) A 15% solution of sodium pyrophosphate containing 2% of phosphoric acid.

(5) A 15% solution of sodium pyrophosphate containing 5% of phosphoric acid.

(6) A 10% solution of disodium dihydrogen pyrophosphate.

(7) A 10% solution of commercial metaphosphoric acid, this acid containing approximately 20% by weight of sodium phosphates.

It will be noted that in each of these examples there is employed an aqueous solution containing dissolved therein a salt of a dehydrated phosphoric acid such as the metaphosphate or pyrophosphate. The presence of such dehydrated phosphoric acid radicals has been found essential, as in their absence the radical of normal or orthophosphoric acid is ineffective.

When the solution of the dehydrated phosphoric acid salt is alkaline, it is found that a slight reddish tinge may be imparted to the cork, but this is overcome by having the solution at a pH of below 7, by employing the acid salt, or by adding acid to produce the effect. Under this condition of acidity, likewise, the efficiency of the compound in preventing discoloration was slightly increased.

Discs impregnated with the foregoing solutions have been found effective in contact with beer in glass bottles, without changing the flavor of the beer. A similar effect is obtained in contact with carbonated water.

The procedure can be employed upon the natural cork, upon ground cork, and upon composition cork discs. When composition cork discs are formed with a gelatin-binder, it is recommended to avoid Formula (7) above, or to reduce the relative acidity, due to partial disintegration of the gelatin-binder by commercial metaphosphoric acid.

The procedure can likewise be employed upon other materials, such as wood and pulp substances which include tannins and the like, whereby the iron-tannin complex might otherwise be formed.

In addition to the sodium salts, it is also feasible to employ potassium and ammonium salts, and to employ the pyrophosphate salts of amines. The solution should not be alkaline, for proper results, but preferably is slightly acid. It has thus been found feasible to admix pyrophosphoric acid with the salt solution, and to employ mixtures of sodium pyrophosphate with disodium dihydrogen pyrophosphate to obtain both the desired concentration and the preferred pH value.

It is obvious that the invention is not limited to the forms of practice illustrated, but that the same may be employed in many ways within the scope of the appended claims.

Having thus described the invention, what is claimed as new and desired to be secured by Letters Patent is:

1. The method of preventing objectionable discoloration of cap lining material containing a tannin through contact with a ferrous cap, which comprises treating the said material with an acid aqueous solution containing a salt of the group consisting of metaphosphoric and pyrophosphoric acids.

2. The method of preventing objectionable discoloration of cork material containing a tannin through contact with a ferrous cap, which comprises impregnating the said material with an acid aqueous solution of an acid salt of an acid of the group consisting of metaphosphoric and pyrophosphoric acids.

3. The method of preventing objectionable discoloration of a composition cork disc in contact with ferrous closure cap, the material of said disc including a gelatin binder, which comprises impregnating the said material with an aqueous acid solution containing a salt of an acid of the group consisting of metaphosphoric and pyrophosphoric acids, the acidity of said solution being less than that of a 10 percent aqueous solution of commercial metaphosphoric acid.

4. A cap lining made from a material containing a tannin, and also containing a salt of an acid of the group consisting of metaphosphoric and pyrophosphoric acids, the pH of the lining being below substantially 7.0.

5. A cap lining comprising a cork disc impregnated with an acid salt of an acid of the group consisting of metaphosphoric and pyrophosphoric acids.

6. A cap lining comprising a composition cork disc having a gelatin binder, said disc being impregnated with the residue produced by drying therein an acid aqueous solution of a salt of an acid of the group consisting of metaphosphoric and pyrophosphoric acids, the acidity being less than that produced by a 10 percent solution of commercial metaphosphoric acid.

WILSON G. PALMER.